United States Patent [19]
Sato

[11] Patent Number: 5,828,490
[45] Date of Patent: Oct. 27, 1998

[54] IMAGE POSITION CORRECTING OPTICAL SYSTEM

[75] Inventor: Susumu Sato, Tokyo, Japan

[73] Assignee: Nikon Corporation, Tokyo, Japan

[21] Appl. No.: 865,898

[22] Filed: May 30, 1997

[30] Foreign Application Priority Data

Mar. 6, 1996 [JP] Japan ................................. 8-163865

[51] Int. Cl.$^6$ .............................. G02B 27/64; G02B 9/12
[52] U.S. Cl. ......................... 359/557; 359/784; 359/554
[58] Field of Search ................................ 359/554, 557, 359/771, 773, 774, 784, 791, 792

[56] References Cited

U.S. PATENT DOCUMENTS

| | | | |
|---|---|---|---|
| 5,579,171 | 11/1996 | Suzuki et al. | 359/687 |
| 5,585,966 | 12/1996 | Suzuki | 359/557 |

FOREIGN PATENT DOCUMENTS

| | | | |
|---|---|---|---|
| 63-115126 | 5/1988 | Japan | G02B 27/64 |
| 2-93620 | 4/1990 | Japan | G02B 27/64 |

Primary Examiner—Thong Nguyen
Assistant Examiner—Mark A. Robinson
Attorney, Agent, or Firm—Chapman and Cutler

[57] ABSTRACT

An image position correcting optical system is provided with a compact and light image-position correction lens group while maintaining excellent optical performance. The image position correcting optical system includes a first lens group $G_1$ that is fixed with respect to a direction perpendicular to an optical axis, a second lens group $G_2$ that can be shifted in the direction perpendicular to the optical axis to correct an image position, and a third lens group $G_3$ that is fixed with respect to the direction perpendicular to the optical axis. The first through third lens groups $G_1$–$G_3$ are positioned in this order from an object side of the system. The second lens group $G_2$ consists of a positive lens and a negative lens. The third lens group $G_3$ includes at least one positive lens and at least one negative lens. The image position correcting optical system satisfies the condition $-0.1 \leq |d|/f3 \leq 0.4$ when d is a distance between a back focal position of the second lens group $G_2$ and a front principal point of the third lens group $G_3$ and f3 is a focal length of the third lens group $G_3$.

36 Claims, 16 Drawing Sheets

FIG. 2a
FNO=2.88
FIG. 2b
Y=21.60
FIG. 2c
Y=21.60
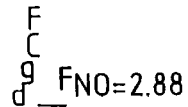
| 0.500 | 0.500 | 2.000% |
|---|---|---|
| SPHERICAL ABERRATION | ASTIGMATISM | DISTORTIONAL ABERRATION |
FIG. 2d
CHROMATIC ABERRATION OF MAGNIFICATION
-0.050
TRANSVERSE ABERRATION
FIG. 2e Y=21.6
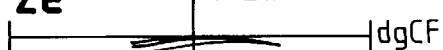 dgCF
TRANSVERSE ABERRATION DURING IMAGE POSITION CORRECTION
FIG. 2f Y=15.1
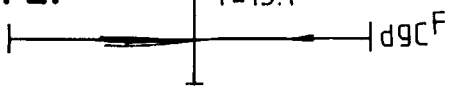 dgCF
FIG. 2j Y=15.1
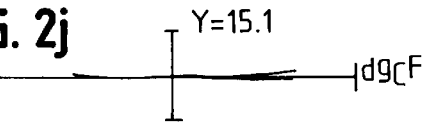 dgCF
FIG. 2g Y=10.8
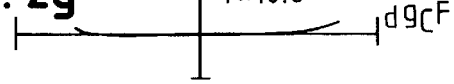 dgCF
FIG. 2k Y=0
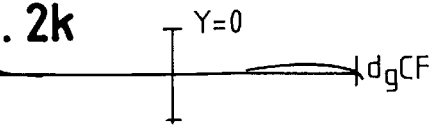 dgCF
FIG. 2h Y=5.4
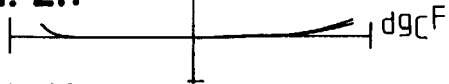 dgCF
FIG. 2l Y=-15.1
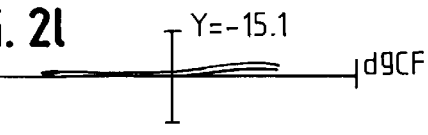 dgCF
FIG. 2i Y=0
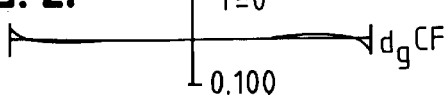 dgCF
0.100

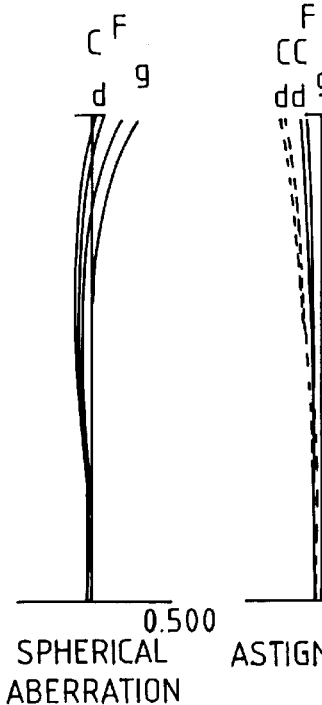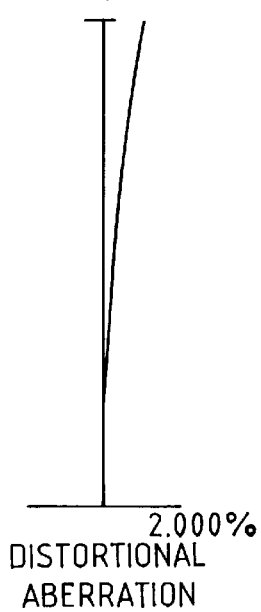
FIG. 3a SPHERICAL ABERRATION
FIG. 3b Y=21.60 ASTIGMATISM
FIG. 3c Y=21.60 DISTORTIONAL ABERRATION
FIG. 3d CHROMATIC ABERRATION OF MAGNIFICATION
TRANSVERSE ABERRATION
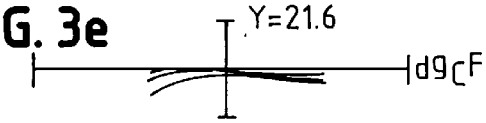
FIG. 3e  Y=21.6
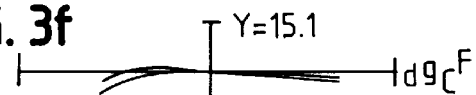
FIG. 3f  Y=15.1
FIG. 3g  Y=10.8
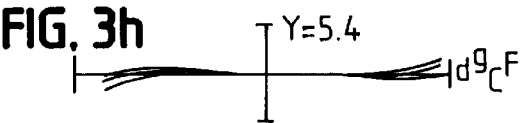
FIG. 3h  Y=5.4
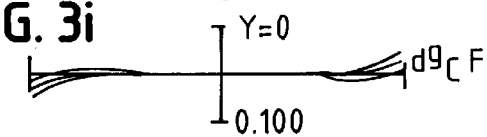
FIG. 3i  Y=0
TRANSVERSE ABERRATION DURING IMAGE POSITION CORRECTION
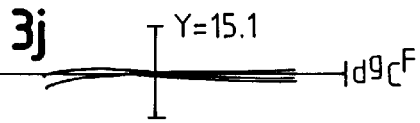
FIG. 3j  Y=15.1
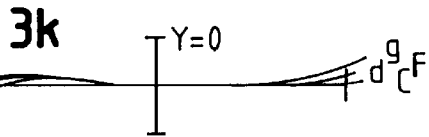
FIG. 3k  Y=0
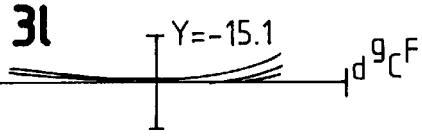
FIG. 3l  Y=−15.1

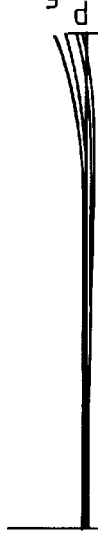

FIG. 6a
FIG. 6b
Y=21.60
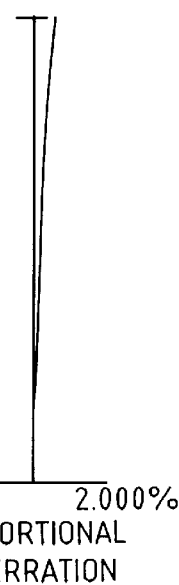
FIG. 6c
Y=21.60
0.500
SPHERICAL
ABERRATION
0.500
ASTIGMATISM
2.000%
DISTORTIONAL
ABERRATION
FIG. 6d
−0.050  CHROMATIC ABERRATION OF MAGNIFICATION
TRANSVERSE ABERRATION
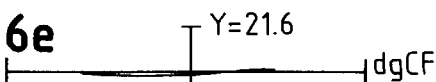
FIG. 6e  Y=21.6
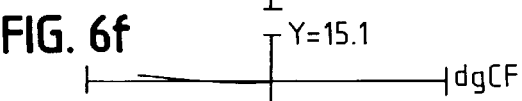
FIG. 6f  Y=15.1
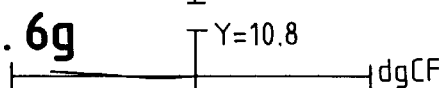
FIG. 6g  Y=10.8
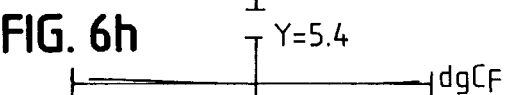
FIG. 6h  Y=5.4
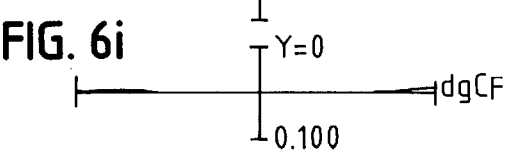
FIG. 6i  Y=0
0.100
TRANSVERSE ABERRATION DURING
IMAGE POSITION CORRECTION
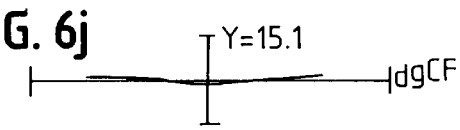
FIG. 6j  Y=15.1
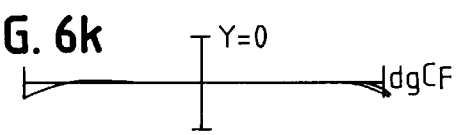
FIG. 6k  Y=0
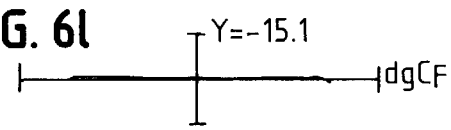
FIG. 6l  Y=−15.1

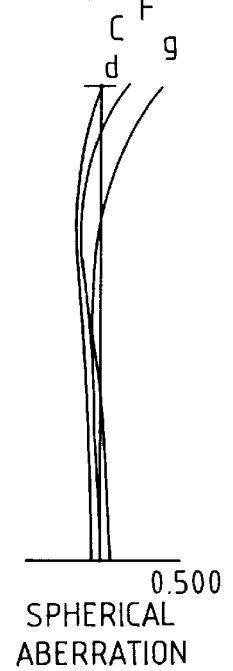
FIG. 8a
$F_{NO}=4.07$
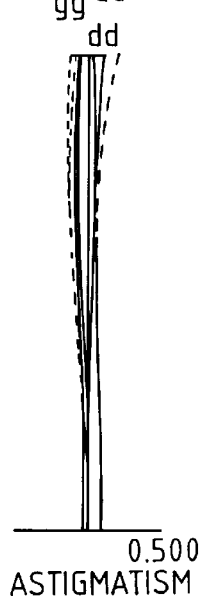
FIG. 8b
Y=21.60
FIG. 8c
Y=21.60
0.500
SPHERICAL
ABERRATION
0.500
ASTIGMATISM
2.000%
DISTORTIONAL
ABERRATION
FIG. 8d
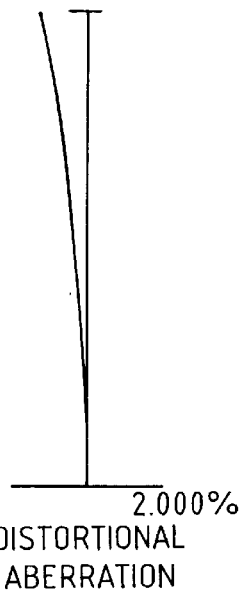
-0.050  CHROMATIC ABERRATION OF MAGNIFICATION
TRANSVERSE ABERRATION
FIG. 8e  Y=21.6
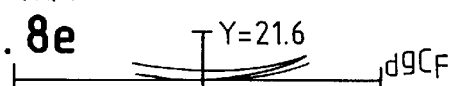
TRANSVERSE ABERRATION DURING
IMAGE POSITION CORRECTION
FIG. 8f  Y=15.1
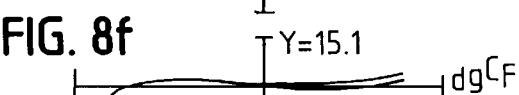
FIG. 8j  Y=15.1
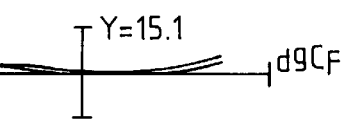
FIG. 8g  Y=10.8
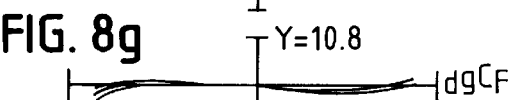
FIG. 8k  Y=0
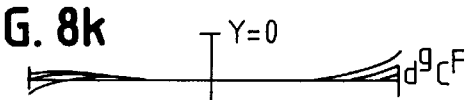
FIG. 8h  Y=5.4
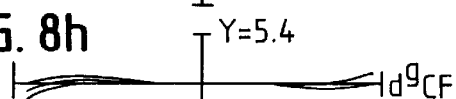
FIG. 8l  Y=-15.1
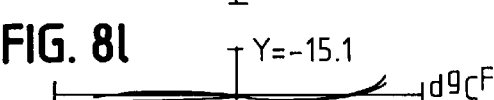
FIG. 8i  Y=0
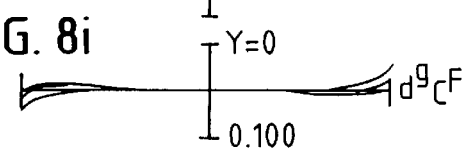
0.100

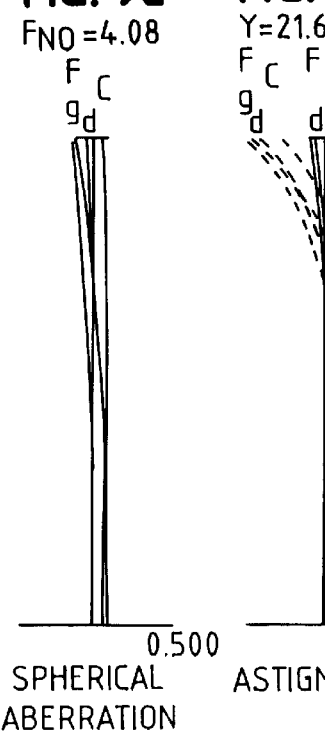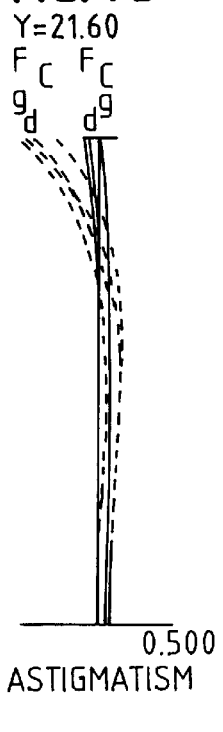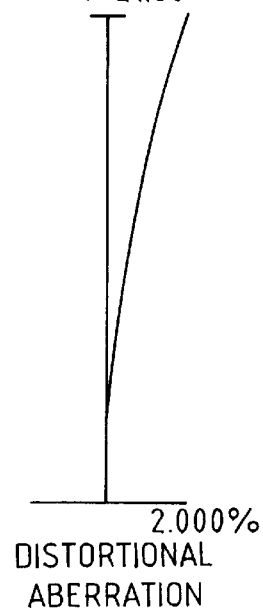

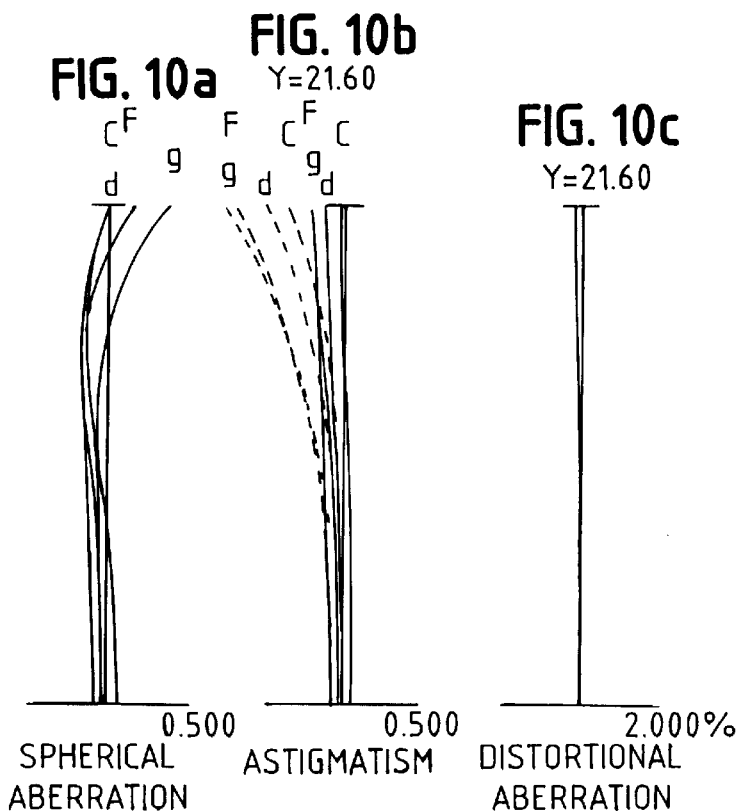
TRANSVERSE ABERRATION
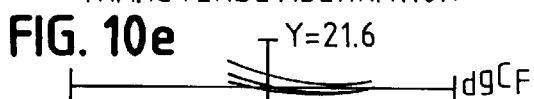
TRANSVERSE ABERRATION DURING IMAGE POSITION CORRECTION
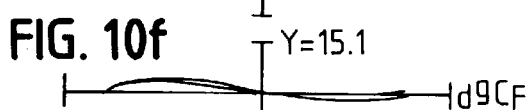
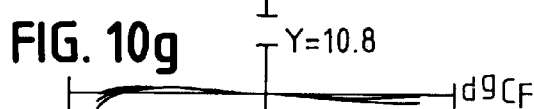
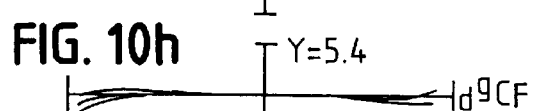
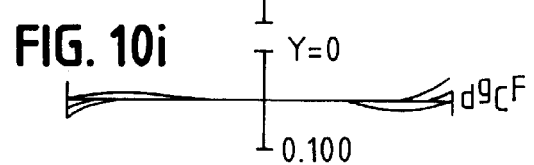

FIG. 11a
SPHERICAL ABERRATION
FIG. 11b
Y=21.60
ASTIGMATISM
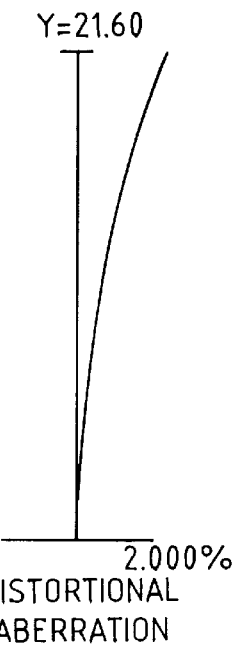
FIG. 11c
Y=21.60
DISTORTIONAL ABERRATION
FIG. 11d
CHROMATIC ABERRATION OF MAGNIFICATION
TRANSVERSE ABERRATION
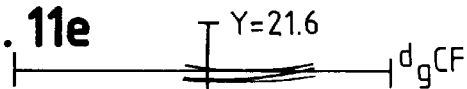
FIG. 11e  Y=21.6
TRANSVERSE ABERRATION DURING IMAGE POSITION CORRECTION
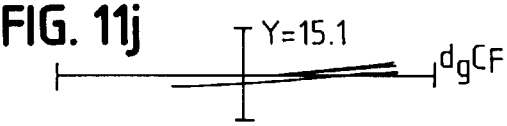
FIG. 11j  Y=15.1
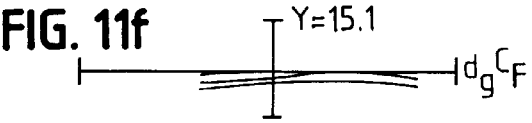
FIG. 11f  Y=15.1
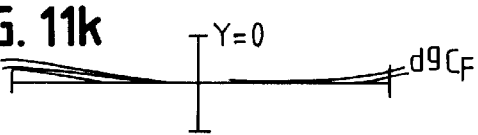
FIG. 11k  Y=0
FIG. 11g
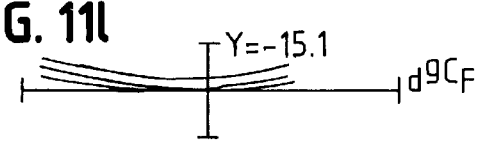
FIG. 11l  Y=−15.1
FIG. 11h  Y=10.8
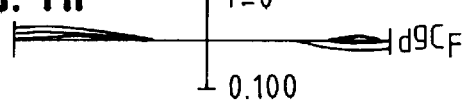
FIG. 11i  Y=0

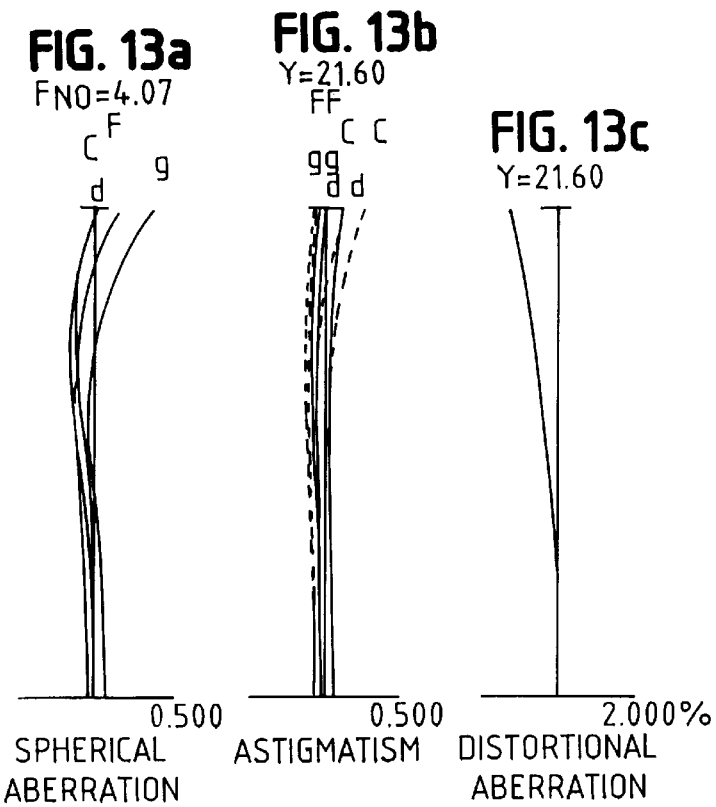
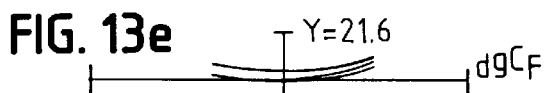
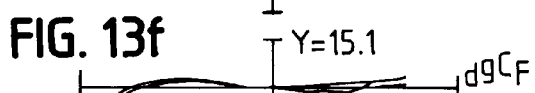
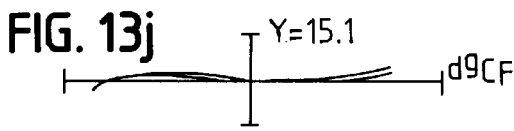
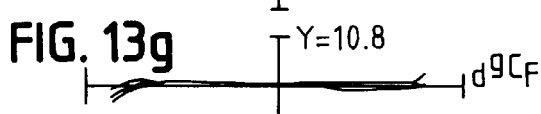
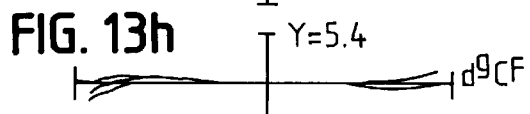
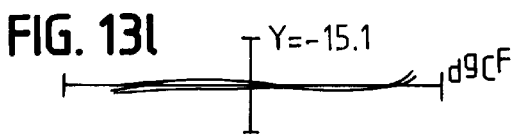
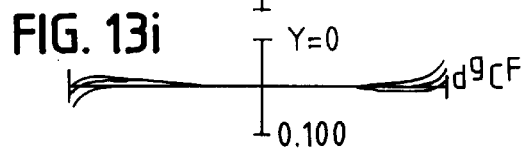

SPHERICAL ABERRATION 0.500

ASTIGMATISM 0.500

DISTORTIONAL ABERRATION 2.000%

FIG. 14d gCF
−0.050 CHROMATIC ABERRATION OF MAGNIFICATION

TRANSVERSE ABERRATION

FIG. 14e Y=21.6 dgCF

FIG. 14f Y=15.1 dgCF

FIG. 14g Y=10.8 dgCF

FIG. 14h Y=5.4 dgCF

FIG. 14i Y=0 dgCF
0.100

TRANSVERSE ABERRATION DURING IMAGE POSITION CORRECTION

FIG. 14j Y=15.1 dgCF

FIG. 14k Y=0 dgCF

FIG. 14l Y=−15.1 dgCF

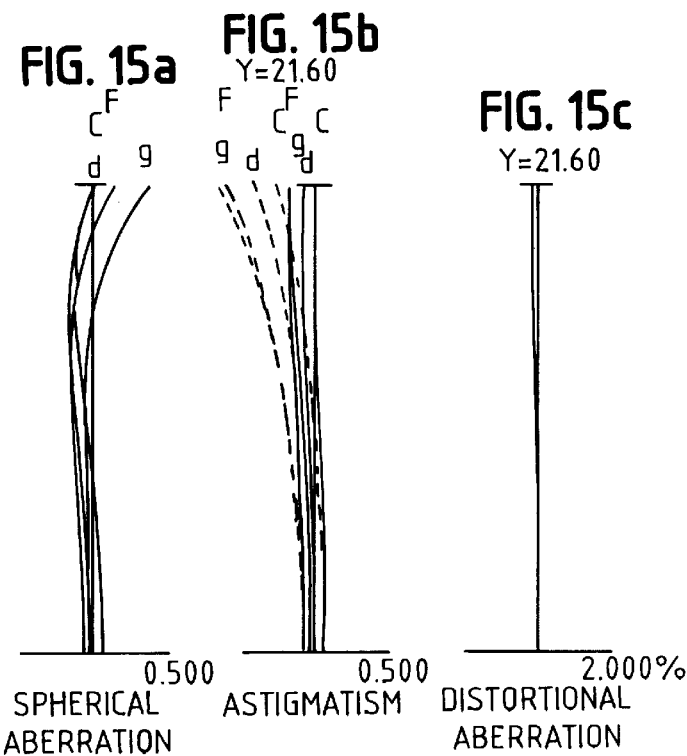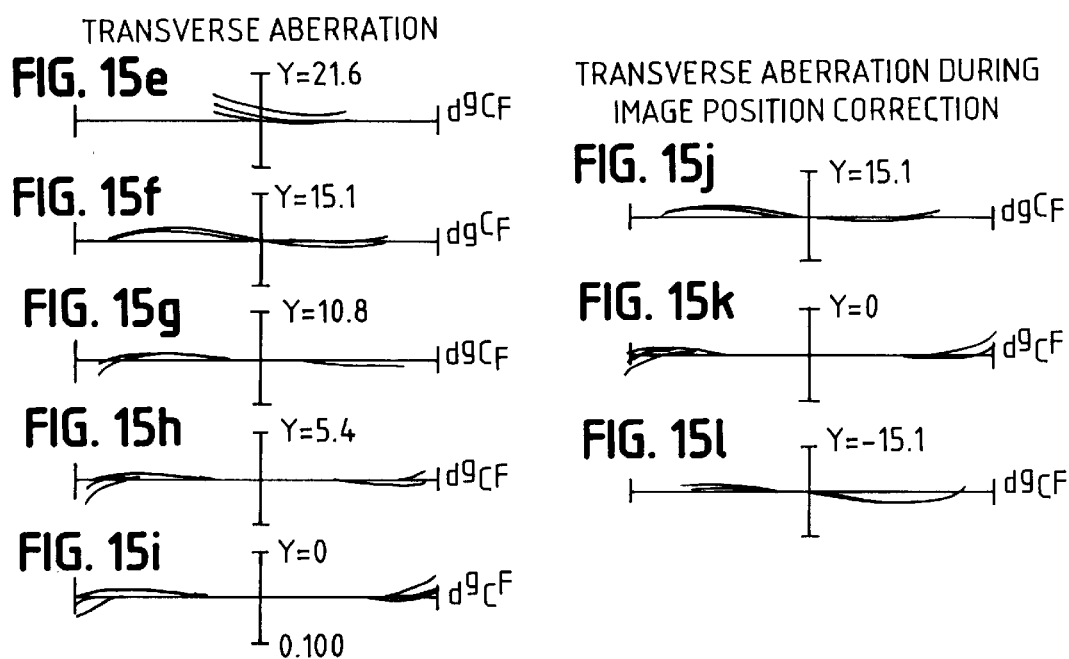

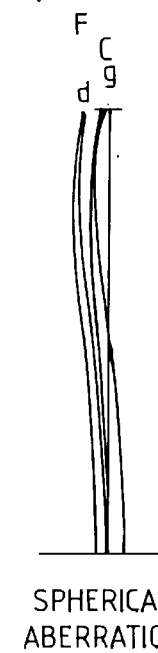
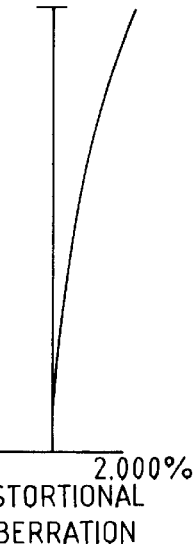
FIG. 16a SPHERICAL ABERRATION
FIG. 16b ASTIGMATISM
FIG. 16c DISTORTIONAL ABERRATION
FIG. 16d CHROMATIC ABERRATION OF MAGNIFICATION
TRANSVERSE ABERRATION
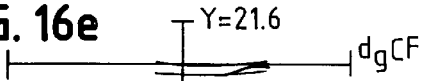
FIG. 16e  Y=21.6
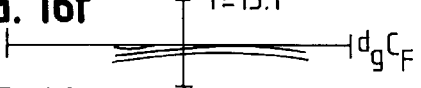
FIG. 16f  Y=15.1
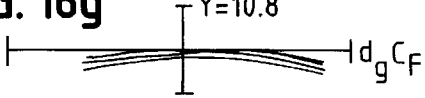
FIG. 16g  Y=10.8
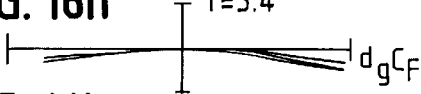
FIG. 16h  Y=5.4
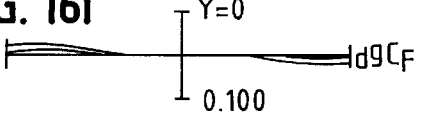
FIG. 16i  Y=0
TRANSVERSE ABERRATION DURING IMAGE POSITION CORRECTION
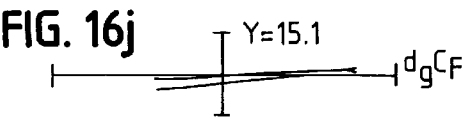
FIG. 16j  Y=15.1
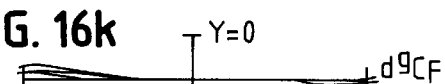
FIG. 16k  Y=0
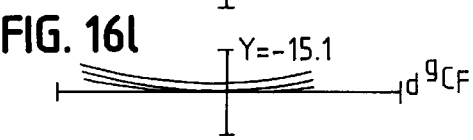
FIG. 16l  Y=−15.1

IMAGE POSITION CORRECTING OPTICAL SYSTEM

BACKGROUND OF THE INVENTION

1. Field of the Invention

The present invention relates to an image position correcting optical system useable in a single-lens reflex camera, an electronic still camera, and so on.

2. Description of Related Art

A conventional image position correcting optical system is disclosed in, for example, Japanese Laid-Open Patent Application No. 2-93620. In such a conventional system, a lens group for correcting an image position (referred to as an image-position correction lens group) has a two-group-three-lens structure. Many lenses are used in the conventional system. Since the number of lenses used in the system is large, the weight of the image-position correction lens group is too high to be suitable for use in connection with a lens shutter camera. A heavy lens group also imposes a high load on the actuator for driving the image-position correction lens group. As a result, it becomes difficult to correct an image position at high frequency. Power consumption of the system also increases.

Japanese Laid-Open Patent Application No. 63-115126 discloses an image-position correction group formed as a cemented tablet based on a one-group-two-lens structure. The optical performance for image-position correction, however, is not adequate for use in connection a single-lens reflex camera.

SUMMARY OF THE INVENTION

It is an object of this invention to provide an image position correcting optical system having a compact and light image-position correction lens group while maintaining an excellent optical performance.

The image position correcting optical system of the present invention includes a first lens group $G_1$, a second lens group $G_2$, and a third lens group $G_3$ which are positioned in this order from an object side. The first lens group $G_1$ is fixed with respect to a direction perpendicular to an optical axis. The second lens group $G_2$ includes a positive lens and a negative lens and is capable of being shifted in a direction perpendicular to the optical axis so as to correct an image position. The third lens group $G_3$ includes at least one positive lens and at least one negative lens and is fixed with respect to the direction perpendicular to the optical axis. The image position correcting optical system satisfies the following condition:

$$-0.1 \leq |d|/f_3 \leq 0.4 \tag{1}$$

when d is a distance between a back focal position of the second lens group $G_2$ and a front principal point of the third lens group $G_3$, and $f_3$ is a focal length of the third lens group $G_3$.

When shifting an image-position correction lens group ($G_2$) in the direction perpendicular to the optical axis to correct an image position, aberrations due to the image correction group itself should be corrected as much as possible. It is important to correct the image position by taking into account a spherical aberration, an astigmatism and a chromatic coma. In order to correct for these three types of aberrations, both a positive lens and a negative lens are necessary. Therefore, the second lens group $G_2$, according to the invention, is designed so as to include a positive lens and a negative lens to minimize the number of lenses used therein.

It is difficult, however, for the current lens design technique to satisfactorily correct for aberrations of a specific lens group having a one-group-two-lens structure or a two-group-two-lens structure and separated from other lens groups. It is more practical, and preferable, to position an image-position correction lens group having a one-group-two-lens structure or a two-group-two-lens structure, in which aberrations are satisfactorily corrected, within a certain lens group having a two-group-four-lens or more complex structure which has a large amount of residual aberration.

According to this concept, the certain lens group referred to is constructed from a second lens group $G_2$, which serves as an image-position correction lens group, and a third lens group $G_3$, which serves as a lens group for producing a residual aberration (referred to an aberration producing lens group).

The aberration producing lens group $G_3$ requires at least one positive lens and at least one negative lens so as to produce residual components of the three types of aberrations which are mentioned above and which are inherently contained in the lens group. Since the aberration producing group $G_3$ is provided only for producing the aberrations, it is preferable to avoid adverse influence to the overall optical system in terms of a power arrangement as much as possible. To this end, the present invention defines the distance d between the back focal position of the second lens group $G_2$ and the front principal point of the third lens group $G_3$ so that it is in the range of:

$$-0.1 \leq |d|/f_3 \leq 0.4 \tag{1}$$

Within the range defined by condition (1), the third lens group $G_3$ is positioned near the second lens group $G_2$ and operates similarly to a field lens, which can reduce influence on the overall optical system in terms of power arrangement.

To correct the aberrations more adequately, the upper limit of the range (1) is preferably set to 0.2.

It is preferable to satisfy condition (2) below in order to reduce an adverse influence of the aberration producing lens group $G_3$ on the overall optical system in terms of a power arrangement.

$$0.7 < |f_2/f_{23}| < 1.3 \tag{2}$$

In condition (2), $f_2$ is a focal length of the second lens group $G_2$, and $f_{23}$ is a composite focal length of the second lens group $G_2$ and the third lens group $G_3$.

It is preferable for the parameter (d) of the condition (1) to have a value in a range between zero and the lower limit. However, even if a "d" value is out of the preferable range but within the range of the condition (1), it is still possible to reduce the influence of the third lens group $G_3$ on the overall optical system in terms of a power arrangement by reducing a power of the third lens group $G_3$.

The condition (2) sets forth a preferable range of the reduced power of the third lens group $G_3$ and results in excellent power arrangements.

To obtain an even better power arrangement, the lower limit of the range may be set to 0.85 and the upper limit of the range may be set to 1.1 ($0.85 < |f_2/f_{23}| < 1.1$).

In order to more satisfactorily correct for the three types of aberrations mentioned above, the second lens group $G_2$ preferably has a positive power and satisfies the following conditions (3) and (4).

$$0.15 < n_n - n_p < 0.40 \tag{3}$$

$$15 < v_p - v_n < 40 \tag{4}$$

In conditions (3) and (4), $n_n$ is a refractive index of a negative lens of the second lens group $G_2$ with respect to a d-line, $n_p$ is a refractive index of a positive lens of the second lens group $G_2$ with respect to the d-line, $v_n$ is an Abbe number of the negative lens of the second lens group $G_2$, and $v_p$ is an Abbe number of the positive lens of the second lens group $G_2$.

If the parameter $(n_n-n_p)$ is below the lower limit of the range specified by condition (3), then a spherical aberration of the image position correction group $G_2$ itself becomes unacceptably large. This is not advantageous, because an amount of flare component increases during correction of an image-position, which affects a resultant picture over a wide area from the center of the picture to its peripheral region. On the other hand, if the parameter $(n_n-n_p)$ exceeds the upper limit of range (3), then the Petzval sum of the image-position correction lens group $G_2$ itself increases in the positive direction. If the field curvature (Petzval curvature) is enlarged so that the field is made flat, then the astigmatism difference becomes large. As a result, image quality in the meridional direction greatly differs from the image quality in the sagittal direction. In addition, a resulting image is blurred and deteriorated.

If the parameter $(v_p-v_n)$ is below the lower limit of the range defined by condition (4), then correction of chromatic coma of the image-position correction lens group $G_2$ itself becomes insufficient. If the parameter $(v_p-v_n)$ exceeds the upper limit of range (4), then correction of the chromatic coma is excessive. In either case, blur occurs in the resultant image as a result of image-position correction.

In order to produce an excellent image through image-position correction, the lower limit of range (3) may preferably be set to 0.2 and the upper limit of inequality (3) may preferably be set to 0.35. It is also preferable to set the lower limit of the range specified by condition (4) at 20 and the upper limit of this range at 35.

In order to efficiently correct chromatic aberration during the image-position correction, it is preferable to cement the negative lens and the positive lens of the second lens group $G_2$ together to form a cemented lens.

In order to improve the image quality during image-position correction, a distance between the second lens group $G_2$ and the third lens group $G_3$, along the optical axis, is preferably maintained constant. In this arrangement, the second lens group $G_2$ and the third lens group $G_3$ move together, along the optical axis, and can be regarded as a single unit in both optical and mechanical design aspects.

As more specific structures of the image position optical correcting optical system according to the present invention, the following examples are preferable.

In a first example, the overall optical system is constituted as a single-focus lens. The first lens group $G_1$ includes a lens group $G_{1a}$ having a positive power and a lens group $G_{1b}$ having a negative power arranged in this order from the object side of the system. Focusing is performed by moving the lens group $G_{1b}$ in the optical-axis direction.

In a second example, the overall optical system is constituted as a single-focus lens. The first lens group $G_1$ includes a lens group $G_{1a}$ having a positive power, a lens group $G_{1b}$ having a negative power and a lens group $G_{1c}$ having a small power. The lens groups $G_{1a}$, $G_{1b}$ and $G_{1c}$ are arranged in this order from the object side of the system. Focusing is carried out by moving the lens group $G_{1b}$ in the optical-axis direction. This example satisfies the following condition:

$$0.7 < |f_2/f_{1c23}| < 1.3 \tag{5}$$

where $f_{1c23}$ is a composite focal length of the lens group $G_{1c}$ of the first lens group $G_1$, the second lens group $G_2$ and the third lens group $G_3$.

The condition (5) gives a preferable small power range of the lens group $G_{1c}$. To obtain a better relative power of the lens group $G_{1c}$, the lower limit of the range specified by condition (5) may be set to 0.8 and the upper limit of the range specified by condition (5) may be set to 1.2.

In a third example, the overall optical system is constituted as a zoom lens. The first lens group $G_1$ includes a lens group $G_{1a}$ having a positive power, a lens group $G_{1b}$ having a negative power and a lens group $G_{1c}$ having a positive power. The lens groups $G_{1a}$, $G_{1b}$ and $G_{1c}$ are arranged in this order from the object side of the system. Zooming is carried out by moving the lens group $G_{1b}$ and the lens group $G_{1c}$ in the optical-axis direction.

In a fourth example, the overall optical system is constituted as a zoom lens. The first lens group $G_1$ includes a lens group $G_{1a}$ having a positive power, a lens group $G_{1b}$ having a negative power, a lens group $G_{1c}$ having a positive power, and a lens group $G_{1d}$ having a small power arranged in this order from the object side of the system. Zooming is carried out by driving or moving the lens group $G_{1b}$ and the lens group $G_{1c}$ in the optical-axis direction. This example meets the following condition:

$$0.7 < |f_2/f_{1d23}| < 1.3 \tag{6}$$

where $f_{1d23}$ is a composite focal length of the lens group $G_{1d}$ of the first lens group $G_1$, the second lens group $G_2$ and the third lens group $G_3$.

The condition (6) gives a preferable range for the small power of the lens group $G_{1d}$. To obtain a superior relative power of lens group $G_{1d}$, the lower limit of the range specified by condition (6) may be set to 0.8 and the upper limit of this range may be set to 1.2.

In this invention, it is preferable to position the front principal point of the third lens group $G_3$ closer to the image than the lens surface of the lens that is included in the third lens group $G_3$ and located nearest the object. This arrangement permits the total length of the overall optical system to be made short.

BRIEF DESCRIPTION OF THE DRAWINGS

FIG. 2 illustrates various aberrations of the first embodiment in an infinity focusing state.

FIG. 3 illustrates the same aberrations of the first embodiment in a close range focusing state.

FIG. 5 illustrates the aberrations of the second embodiment in an infinity focusing state.

FIG. 6 illustrates the aberrations of the second embodiment in a close range focusing state.

FIG. 8 illustrates the aberrations of the third embodiment at the wide-angle end in an infinity focusing state.

FIG. 9 illustrates the aberrations of the third embodiment at the telescopic end in an infinity focusing state.

FIG. 10 illustrates the aberrations of the third embodiment at the wide-angle end in a close range focusing state.

FIG. 11 illustrates the aberrations of the third embodiment at the telescopic end in a close range focusing state.

FIG. 13 illustrates the aberrations of the fourth embodiment at the wide-angle end in an infinity focusing state.

FIG. 14 illustrates the aberrations of the fourth embodiment at the telescope end in an infinity focusing state.

FIG. 15 illustrates the aberrations of the fourth embodiment at the wide-angle end in a close range focusing state.

FIG. 16 illustrates the aberrations of the fourth embodiment at the telescopic end in a close range focusing state.

DESCRIPTION OF THE PREFERRED EMBODIMENTS

Figure 1:
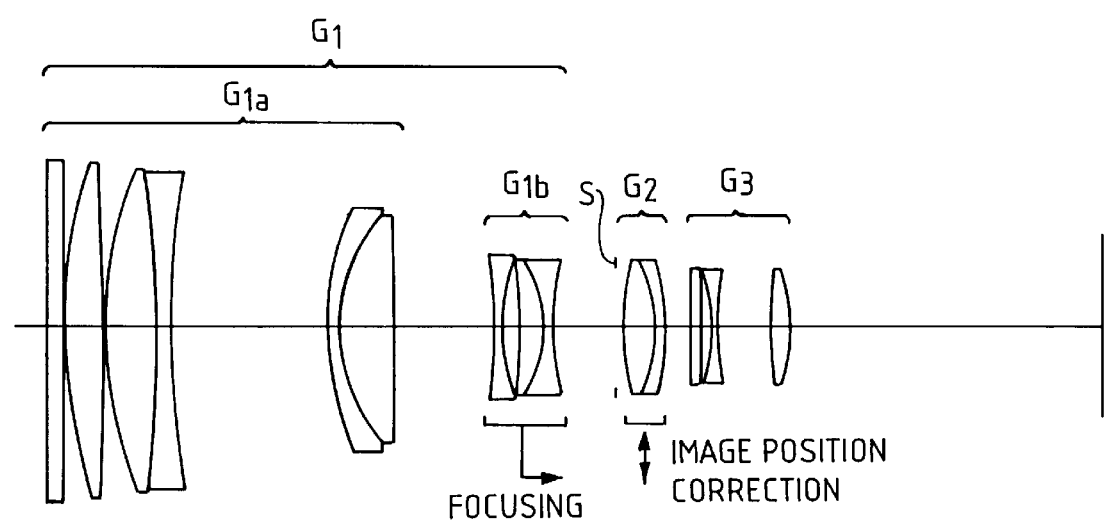
FIG. 1 illustrates a lens arrangement according to a first embodiment of the invention.
Figure 4:
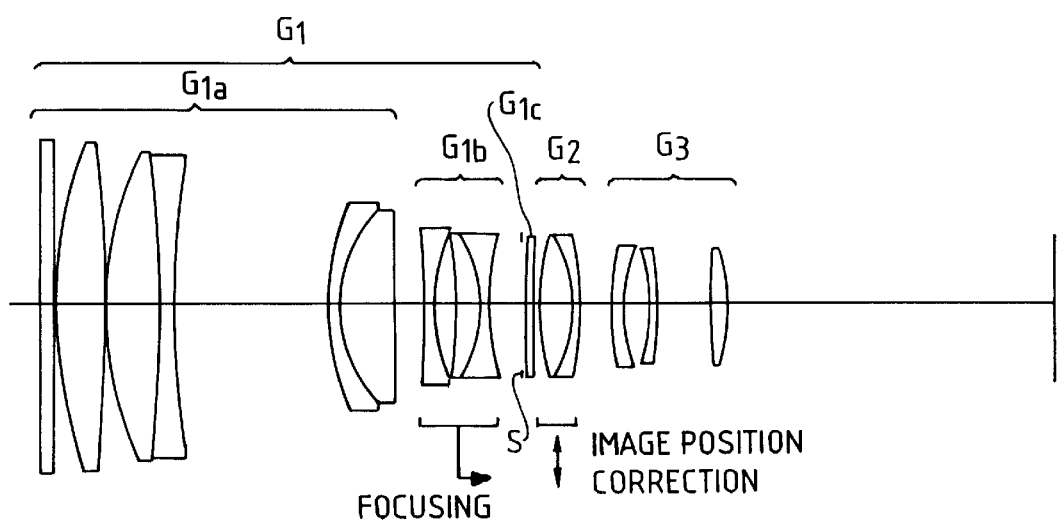
FIG. 4 illustrates a lens arrangement according to a second embodiment of the invention.
Figure 7:
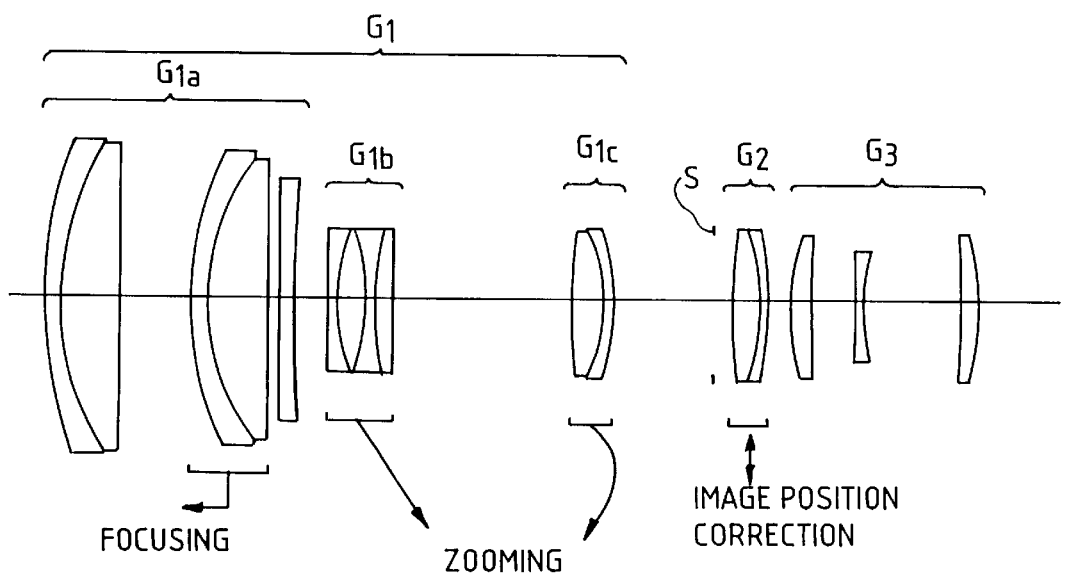
FIG. 7 illustrates a lens arrangement according to a third embodiment of the invention.
Figure 12:
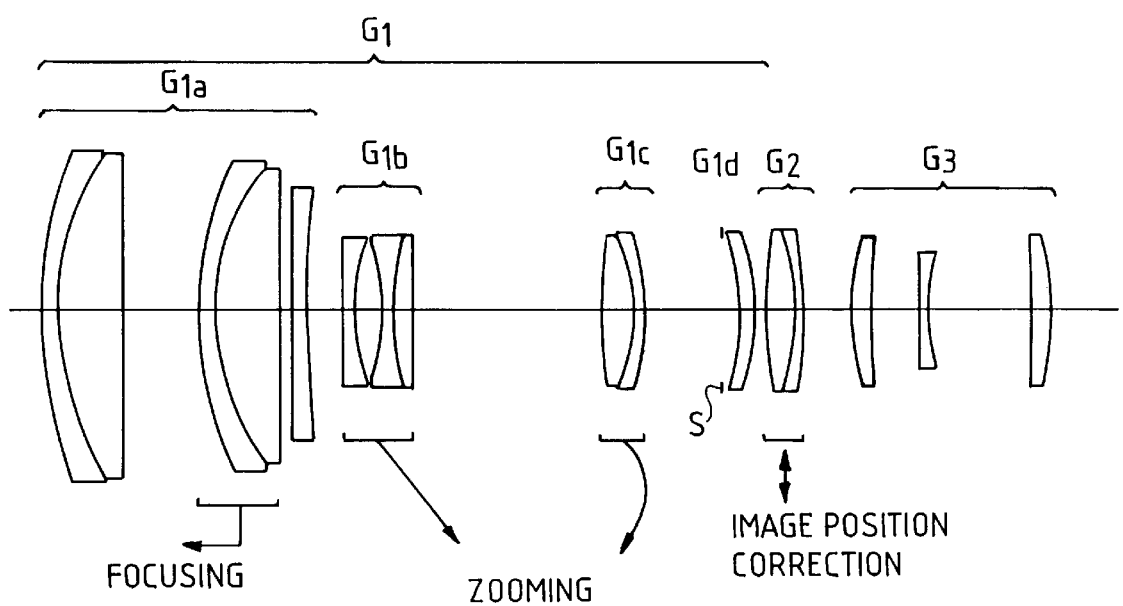
FIG. 12 is a lens arrangement according to a fourth embodiment of the invention.

Preferred embodiments of the image position correcting optical system according to the invention will be described in conjunction with the attached drawings. FIGS. 1, 4, 7, and 12 illustrate lens arrangements of a first embodiment through a fourth embodiment, respectively. In each of the embodiments, the image position correcting optical system comprises a first lens group $G_1$ that is fixed with respect to a direction perpendicular to an optical axis, a second lens group $G_2$ that can be moved (decentered) in the direction perpendicular to the optical-axis, and a third lens group $G_3$ that is fixed with respect to the direction perpendicular to the optical-axis. The first through third lens groups $G_1$ through $G_3$ are positioned in this order from an object side of the system. In each of the embodiments, the second lens group $G_2$ is a cemented lens of a bi-convex lens and a meniscus concave lens which are positioned in this order from the object side of the system.

The first embodiment corresponds to the first example mentioned above. The first lens group $G_1$ includes a lens group $G_{1a}$ having a positive power and a lens group $G_{1b}$ having a negative power. The lens groups $G_{1a}$ and $G_{1b}$ are arranged in this order from the object side of the system. Focusing is carried out by driving or moving the lens group $G_{1b}$ in the optical-axis direction. The lens group $G_{1a}$ and the lens group $G_{1b}$ form an afocal optical system. The third lens group $G_3$ has a three-group-three-lens structure of a convex-concave-convex type.

The second embodiment corresponds to the second example. The first lens group $G_1$ includes a lens group $G_{1a}$ having a positive power, a lens group $G_{1b}$ having a negative power and a lens group $G_{1c}$ having a small negative power. The lens groups $G_{1a}$, $G_{1b}$ and $G_{1c}$ are arranged in this order from the object side of the system. Focusing is carried out by moving the lens group $G_{1b}$ in the optical-axis direction. The lens group $G_{1a}$ and the lens group $G_{1b}$ form an afocal optical system. The third lens group $G_3$ has a three-group-three-lens structure of a concave-concave-convex type.

The third embodiment corresponds to the third example. The first lens group $G_1$ includes a lens group $G_{1a}$ having a positive power, a lens group $G_{1b}$ having a negative power and a lens group $G_{1c}$ having a positive power. The lens groups $G_{1a}$, $G_{1b}$ and $G_{1c}$ are arranged in this order from the object side of the system. Zooming is carried out by moving the lens group $G_{1b}$ and the lens group $G_{1c}$ in the optical-axis direction. The lens group $G_{1a}$, the lens group $G_{1b}$ and the lens group $G_{1c}$ form an afocal optical system. Focusing is carried out using the lens group $G_{1a}$ of the first lens group $G_1$. The lens group $G_{1a}$ has a positive-positive-negative power arrangement with positive, positive and negative elements in this order from its object side. Focusing is performed by moving the second lens of the lens group $G_{1a}$, which has a positive power, along the optical-axis. The third lens group $G_3$ has a three-group-three-lens structure of a convex-concave-convex type.

The fourth embodiment corresponds to the fourth example. The first lens group $G_1$ includes a lens group $G_{1a}$ having a positive power, a lens group $G_{1b}$ having a negative power, a lens group $G_{1c}$ having a positive power, and a lens group $G_{1d}$ having a small positive power. The lens groups $G_{1a}$, $G_{1b}$ and $G_{1c}$ are arranged in this order from the object side. Zooming is carried out by moving the lens group $G_{1b}$ and the lens group $G_{1c}$ along the optical-axis direction. The lens group $G_{1a}$, the lens group $G_{1b}$ and the lens group $G_{1c}$ form an afocal optical system. Focusing is carried out using the first lens group $G_1$. The lens group $G_{1a}$ of the first lens group $G_1$ has positive-positive-negative power arrangement with positive, positive and negative elements in this order from its object side. Focusing is performed by moving the second lens having a positive power in the optical-axis direction. The third lens group $G_3$ has a three-group-three-lens structure of a convex-concave-convex type.

In each embodiment, an aperture stop S is positioned directly before or in the vicinity of the second lens group $G_2$. Anti-vibration correction is performed by moving the second lens group $G_2$ in a direction perpendicular to the optical axis.

Tables 1 through 4 list values of parameters in connection with the first through fourth embodiments, respectively. In the "Major Parameters" section of each table, f is a focal length, in mm, of the overall system, FN is an F number, $bf_2$ is a back focus, in mm, of the second lens group $G_2$, $f_3$ is a focal length, in mm, of the third lens group $G_3$, $bf_3$ is a back focus, in mm, of the third lens group $G_3$, D is an air gap, in mm, between the lens plane of the second lens group $G_2$ located nearest the image and the lens plane of the third lens group $G_3$ located nearest the object. Accordingly, a distance d, in mm, between the back focal position of the second lens group $G_2$ and the front principal point of the third lens group $G_3$ is given by:

$$d=(f_3-bf_3)-(bf_2-D).$$

In the "Lens Parameters" section of each table, the first column denotes a lens surface number, the second column r denotes a radius of curvature, in mm, of a lens surface, the third column d denotes a distance, in mm, between lens surfaces, the fourth column v denotes an Abbe number of each lens with respect to the d-line ($\lambda$=587.6 nm) of a lens, the fifth column $n_d$ denotes a refractive index of a lens with respect to the d-line, and the sixth column denotes a group number to which each lens belongs. Characters P and N in the sixth column indicate the positive lens and the negative lens of the second lens group $G_2$, respectively.

In the "Variable Air Gap" section of each table, R denotes a distance, in mm, between an object point and an image point. In the "Image Position Correction" section of each table, a moving distance, in mm, of $G_2$ is a shifting amount of the second lens group $G_2$ in the direction perpendicular to the optical axis.

Table 5 lists values of the parameters which appear in the conditions (inequalities) (1) through (4).

TABLE 1

| [Major Parameters] | | | |
|---|---|---|---|
| f = | 294.0 | FN = | 2.9 |
| $f_2$ = | 111.43837 | $bf_2$ = | 107.36088 |
| $f_3$ = | 490.74046 | $bf_3$ = | 390.03696 |
| $f_{23}$ = | 111.70176 | | |
| D = | 7.8145 | d = | 1.15712 |

| [Lens Parameters] | | | | | |
|---|---|---|---|---|---|
| | r | d | v | $n_d$ | |
| 1 | ∞ | 4.0000 | 64.10 | 1.516800 | $G_{1a}$ |
| 2 | ∞ | 0.6000 | | | |
| 3 | 173.8655 | 12.0000 | 82.52 | 1.497820 | $G_{1a}$ |
| 4 | −978.0647 | 0.2000 | | | |

TABLE 1-continued

| | | | | | |
|---|---|---|---|---|---|
| 5 | 133.6355 | 15.0000 | 82.52 | 1.497820 | $G_{1a}$ |
| 6 | −464.6940 | 5.0000 | 46.54 | 1.804109 | $G_{1a}$ |
| 7 | 332.9179 | 46.3000 | | | |
| 8 | 99.5535 | 3.5000 | 45.00 | 1.744000 | $G_{1a}$ |
| 9 | 55.6310 | 15.9000 | 82.52 | 1.497820 | $G_{1a}$ |
| 10 | −1371.0597 | ($d_{10}$) | | | |
| 11 | −169.9686 | 2.7000 | 64.10 | 1.516800 | $G_{1b}$ |
| 12 | 67.2847 | 4.5100 | | | |
| 13 | −192.9273 | 7.0000 | 33.89 | 1.803840 | $G_{1b}$ |
| 14 | −43.0810 | 2.8000 | 61.09 | 1.589130 | $G_{1b}$ |
| 15 | 83.8867 | ($d_{15}$) | | | |
| 16 | (diaphragm) | 2.0000 | | | |
| 17 | 86.7590 | 9.0000 | 69.98 | 1.518601 | $G_{2\,(P)}$ |
| 18 | −52.1033 | 2.5000 | 40.90 | 1.796310 | $G_{2\,(N)}$ |
| 19 | −94.2794 | 7.8145 | | | |
| 20 | 388.4598 | 3.0000 | 33.89 | 1.803840 | $G_3$ |
| 21 | −1298.5910 | 3.0000 | | | |
| 22 | −73.8165 | 2.0000 | 48.97 | 1.531721 | $G_3$ |
| 23 | 82.8359 | 15.8000 | | | |
| 24 | 143.4418 | 5.5000 | 82.52 | 1.497820 | $G_3$ |
| 25 | −67.2423 | (bf) | | | |

[Variable Air Gap]

| f = 294.0 | R = 2500 |
|---|---|
| $d_{10}$: 29.55054 | 40.40528 |
| $d_{15}$: 18.85357 | 7.99883 |
| bf: 91.75481 | 91.75481 |

[Image Position Correction]

| $G_2$ moving distance: | 1.00 mm |
|---|---|
| Image moving distance: | 1.00 mm |

TABLE 2

[Major Parameters]

| f = | 294.0 | FN = | 2.9 |
|---|---|---|---|
| $f_2$ = | 101.51556 | $bf_2$ = | 96.91014 |
| $f_3$ = | 580.16771 | $bf_3$ = | 440.10625 |
| $f_{23}$ = | 111.73254 | $f_{1c23}$ = | 121.79999 |
| D = | 9.90000 | d = | 53.05132 |

[Lens Parameters]

| | r | d | ν | $n_d$ | |
|---|---|---|---|---|---|
| 1 | ∞ | 4.0000 | 64.10 | 1.516800 | $G_{1a}$ |
| 2 | ∞ | 0.6000 | | | |
| 3 | 156.4526 | 14.5000 | 82.52 | 1.497820 | $G_{1a}$ |
| 4 | −613.6370 | 0.2000 | | | |
| 5 | 118.1317 | 16.0000 | 82.52 | 1.497820 | $G_{1a}$ |
| 6 | −484.2477 | 5.0000 | 46.54 | 1.804109 | $G_{1a}$ |
| 7 | 313.4864 | 46.3000 | | | |
| 8 | 88.4153 | 3.5000 | 45.00 | 1.744000 | $G_{1a}$ |
| 9 | 47.3636 | 15.9000 | 82.52 | 1.497820 | $G_{1a}$ |
| 10 | 1107.7511 | ($d_{10}$) | | | |
| 11 | −229.2536 | 2.7000 | 65.77 | 1.464500 | $G_{1b}$ |
| 12 | 59.9723 | 6.5000 | | | |
| 13 | −155.0327 | 7.0000 | 33.89 | 1.803840 | $G_{1b}$ |
| 14 | −48.4554 | 2.8000 | 60.69 | 1.563840 | $G_{1b}$ |
| 15 | 86.1706 | ($d_{15}$) | | | |
| 16 | (diaphragm) | | | | |
| 17 | 454.0218 | 2.0000 | 64.10 | 1.516800 | $G_{1c}$ |
| 18 | 235.5304 | 2.0000 | | | |
| 19 | 86.7341 | 10.0000 | 65.42 | 1.603001 | $G_{2\,(P)}$ |
| 20 | −50.2097 | 2.0000 | 39.82 | 1.869940 | $G_{2\,(N)}$ |
| 21 | −104.0131 | 9.9000 | | | |
| 22 | 106.4906 | 3.1000 | 65.77 | 1.464500 | $G_3$ |
| 23 | 50.3242 | 8.0000 | | | |
| 24 | −60.3389 | 2.0000 | 47.07 | 1.670030 | $G_3$ |
| 25 | −131.5318 | 16.1000 | | | |
| 26 | 195.0326 | 5.0000 | 60.64 | 1.603110 | $G_3$ |
| 27 | −85.2722 | (bf) | | | |

TABLE 2-continued

[Variable Air Gap]

| f = 294.0 | R = 3500 |
|---|---|
| $d_{10}$: 9.29910 | 15.65817 |
| $d_{15}$: 10.07843 | 3.71936 |
| bf: 98.38630 | 98.38630 |

[Image Position Correction]

| $G_2$ moving distance: | 0.83 mm |
|---|---|
| Image moving distance: | 1.00 mm |

TABLE 3

[Major Parameters]

| f = | 105.0 to 285.0 | FN = | 4.1 |
|---|---|---|---|
| $f_2$ = | 123.50070 | $bf_2$ = | 121.14007 |
| $f_3$ = | 3191.48177 | $bf_3$ = | 2934.22618 |
| $f_{23}$ = | 129.22451 | | |
| D = | 5.2464 | d = | 141.36192 |

[Lens Parameters]

| | r | d | ν | $n_d$ | |
|---|---|---|---|---|---|
| 1 | 105.1324 | 3.5000 | 48.97 | 1.531721 | $G_{1a}$ |
| 2 | 68.4040 | 13.0000 | 64.10 | 1.516800 | $G_{1a}$ |
| 3 | 4181.9580 | ($d_3$) | | | |
| 4 | 84.9885 | 3.2000 | 40.90 | 1.796310 | $G_{1a}$ |
| 5 | 53.8703 | 13.0000 | 82.52 | 1.497820 | $G_{1a}$ |
| 6 | 1279.9706 | ($d_6$) | | | |
| 7 | −19883.690 | 3.3000 | 33.89 | 1.803840 | $G_{1a}$ |
| 8 | 337.2063 | ($d_8$) | | | |
| 9 | −603.0266 | 2.0000 | 60.03 | 1.640000 | $G_{1b}$ |
| 10 | 45.0141 | 6.0000 | | | |
| 11 | −50.7041 | 2.0000 | 60.03 | 1.640000 | $G_{1b}$ |
| 12 | 63.1562 | 4.0000 | 23.01 | 1.860741 | $G_{1b}$ |
| 13 | 4599.2842 | ($d_{13}$) | | | |
| 14 | 121.6975 | 7.0000 | 82.52 | 1.497820 | $G_{1c}$ |
| 15 | −36.8957 | 2.0000 | 33.89 | 1.803840 | $G_{1c}$ |
| 16 | −60.7875 | ($d_{16}$) | | | |
| 17 | (diaphragm) | 4.0000 | | | |
| 18 | 106.8858 | 6.0000 | 69.98 | 1.518601 | $G_{2\,(P)}$ |
| 19 | −55.4675 | 1.7000 | 40.90 | 1.796310 | $G_{2\,(N)}$ |
| 20 | −95.7695 | 5.2464 | | | |
| 21 | 57.8011 | 4.0000 | 60.03 | 1.640000 | $G_3$ |
| 22 | 203.5040 | 9.9000 | | | |
| 23 | −276.9243 | 1.6000 | 51.09 | 1.733500 | $G_3$ |
| 24 | 48.5368 | 20.9000 | | | |
| 25 | −382.9373 | 3.8777 | 55.60 | 1.696800 | $G_3$ |
| 26 | −74.7300 | (bf) | | | |

[Variable Air Gap]

| | f = 105.0 | f = 285.0 | R = 2000 | R = 2000 |
|---|---|---|---|---|
| $d_3$: | 15.97848 | 15.97848 | 1.40120 | 1.40120 |
| $d_6$: | 2.88737 | 2.88737 | 17.46465 | 17.46465 |
| $d_8$: | 7.34880 | 52.54102 | 7.34880 | 52.54102 |
| $d_{13}$: | 38.71128 | 1.49294 | 38.71128 | 1.49294 |
| $d_{16}$: | 21.64306 | 13.66917 | 21.64306 | 13.66917 |
| bf: | 85.83246 | 85.83246 | 85.83246 | 85.83246 |

[Image Position Correction]

Wide-angle end

| $G_2$ moving distance: | 0.32 mm |
|---|---|
| Image moving distance: | 0.33 min |

Telescopic end

| $G_2$ moving distance: | 0.95 mm |
|---|---|
| Image moving distance: | 1.00 mm |

TABLE 4

[Major Parameters]

| | | | |
|---|---|---|---|
| f = | 105.0 to 285.0 | FN = | 4.1 |
| $f_2$ = | 131.33811 | $bf_2$ = | 128.63221 |
| $f_3$ = | 3191.48177 | $bf_3$ = | 2936.85672 |
| $f_{23}$ = | 137.17556 | $f_{1d23}$ = | 129.22450 |
| D = | 9.8193 | d = | 135.81214 |

[Lens Parameters]

| | r | d | υ | $n_d$ | |
|---|---|---|---|---|---|
| 1 | 105.1324 | 3.5000 | 48.97 | 1.531721 | $G_{1a}$ |
| 2 | 68.4040 | 13.0000 | 64.10 | 1.516800 | $G_{1a}$ |
| 3 | 4181.9599 | ($d_3$) | | | |
| 4 | 84.9885 | 3.2000 | 40.90 | 1.796310 | $G_{1a}$ |
| 5 | 53.8703 | 13.0000 | 82.52 | 1.497820 | $G_{1a}$ |
| 6 | 1279.9706 | ($d_6$) | | | |
| 7 | −19883.690 | 3.3000 | 33.89 | 1.803840 | $G_{1a}$ |
| 8 | 337.2063 | ($d_8$) | | | |
| 9 | −603.0266 | 2.0000 | 60.03 | 1.640000 | $G_{1b}$ |
| 10 | 45.0141 | 6.0000 | | | |
| 11 | −50.7041 | 2.0000 | 60.03 | 1.640000 | $G_{1b}$ |
| 12 | 63.1562 | 4.0000 | 23.01 | 1.860741 | $G_{1b}$ |
| 13 | 4599.2842 | ($d_{13}$) | | | |
| 14 | 121.6975 | 7.0000 | 82.52 | 1.497820 | $G_{1c}$ |
| 15 | −36.8957 | 2.0000 | 33.89 | 1.803840 | $G_{1c}$ |
| 16 | −60.7875 | ($d_{16}$) | | | |
| 17 | (diaphragm) | 4.0000 | | | |
| 18 | −51.1604 | 3.0000 | 64.10 | 1.516800 | $G_{1d}$ |
| 19 | −50.4730 | 2.0000 | | | |
| 20 | 101.6180 | 6.0000 | 69.98 | 1.518601 | $G_{2(P)}$ |
| 21 | −58.6479 | 1.7000 | 40.90 | 1.796310 | $G_{2(N)}$ |
| 22 | −109.0743 | 9.8193 | | | |
| 23 | 57.6120 | 4.0000 | 60.03 | 1.640000 | $G_3$ |
| 24 | 198.8566 | 9.9000 | | | |
| 25 | −278.6195 | 1.6000 | 51.09 | 1.733500 | $G_3$ |
| 26 | 48.6281 | 20.9000 | | | |
| 27 | −531.7369 | 3.8777 | 55.60 | 1.696800 | $G_3$ |
| 28 | −78.8792 | (bf) | | | |

[Variable Air Gap]

| | f = 105.0 | f = 285.0 | R = 2000 | R = 2000 |
|---|---|---|---|---|
| $d_3$: | 15.97848 | 15.97848 | 1.39364 | 1.39364 |
| $d_6$: | 2.88737 | 2.88737 | 17.47221 | 17.47221 |
| $d_8$: | 7.34880 | 52.54102 | 7.34880 | 52.54102 |
| $d_{13}$: | 38.71128 | 1.49294 | 38.71128 | 1.49294 |
| $d_{16}$: | 15.96677 | 7.99288 | 15.96677 | 7.99288 |
| bf: | 82.82164 | 82.82164 | 82.82164 | 82.82164 |

[Image Position Correction]

Wide-angle end

| | |
|---|---|
| $G_2$ moving distance: | 0.33 mm |
| Image moving distance: | 0.33 mm |

Telescopic edge

| | |
|---|---|
| $G_2$ moving distance: | 1.00 mm |
| Image moving distance: | 1.00 mm |

TABLE 5

| Embodiment No. | | 1 | 2 | 3 | 4 |
|---|---|---|---|---|---|
| (1) | $|d|/f_3$ | 0.002 | 0.091 | 0.004 | 0.004 |
| (2) | $f_2/f_{23}$ | 0.998 | 0.909 | 0.956 | 0.957 |
| (3) | $n_n − n_p$ | 0.278 | 0.267 | 0.278 | 0.278 |
| (4) | $υ_p − υ_n$ | 29.08 | 25.6 | 29.08 | 29.08 |
| (5) | $|f_2/f_{1c23}|$ | — | 0.833 | — | — |
| (6) | $|f_2/f_{1d23}|$ | — | — | — | 1.016 |

FIG. 2 shows spherical aberration, astigmatism, distortional aberration, chromatic aberration of magnification, transverse aberration, and transverse aberration during the image position correction process of the first example in the infinity focusing state. FIG. 3 is similar to the FIG. 2, but shows the aberrations of the first embodiment in the close range focusing state. FIGS. 5 and 6 illustrate the same aberrations of the second example in the infinity focusing state and the close range focusing state, respectively. Regarding the third embodiment, FIGS. 8 and 9 illustrate the aberrations in the infinity focusing state at the wide-angle end and the telescopic end, respectively, while FIGS. 10 and 11 show the same aberrations in the close range focusing state at the wide-angle end and the telescopic end, respectively. FIGS. 13 and 14 illustrate the aberrations of the fourth example in the infinity focusing state at the wide-angle end and the telescopic end, respectively, while FIGS. 15 and 16 show the aberrations in the close range focusing state at the wide-angle end and the telescopic end. As to the astigmatism, dashed lines indicate meridional image planes, and solid lines indicate sagittal image planes.

As is clear from these figures, the image position correcting optical system of each embodiment can achieve an excellent image quality over a wide range from infinity to a close range in both the normal photographing mode and the image-position correction mode.

Although the aperture stop S used in each embodiment is positioned directly before the image-position correction lens group $G_2$, the aperture stop S may be positioned directly behind or near the image-position correction lens group $G_2$.

While the second lens group $G_2$ of each of the embodiments includes a convex lens and a concave lens in this order from the object side, the lens arrangement may be reversed so that the lens group $G_2$ includes a concave lens and a convex lens in this order from the object side of the system. In each embodiment, an image position is corrected by 0.33 mm and 1 mm on the image plane. However, the amount of image-position correction may be below or above these values.

According to the present invention, an improved image position correcting optical system is provided. The image-position correction lens group is made compact and light while maintaining an excellent optical performance.

Furthermore, a hand-shake or movement detector, such as an angular acceleration detector, a driver for driving the image-position correction lens group, and a controller (such as an LSI) for processing information from the hand-shake detector to control the driver may be added to the optical system of the present invention, thereby easily incorporating a hand-shake correcting lens system into the optical system of the invention.

I claim:

1. An image position correcting optical system comprising:

a first lens group that is fixed with respect to a direction perpendicular to an optical axis, a second lens group that is decentered as necessary in the direction perpendicular to the optical axis to correct an image position, and a third lens group that is fixed with respect to the direction perpendicular to the optical axis, the first, second and third lens groups being positioned in order from an object side of the system, the second lens group consisting of a positive lens and a negative lens, the third lens group including a positive lens, a negative lens and an additional lens, said image position correcting optical system satisfying a condition:

$$-0.1 \leq |d|/f3 \leq 0.4$$

when $|d|$ is an absolute distance from a back focal position of the second lens group to a front principal point of the third lens group and f3 is a focal length of the third lens group; and wherein:

$$0.7<|f2/F23|<1.3$$

when f2 is a focal length of the second lens group, and F23 is a composite focal length of the second lens group and the third lens group.

2. The image position correcting optical system according to claim 1, wherein the second lens group has a positive power and:

$$0.15<Nn-Np<0.40, \text{ and}$$

$$15<\nu p-\nu n<40$$

when Nn is an index of refraction of the negative lens of the second lens group with respect to a d-line, Np is an index of refraction of the positive lens of the second lens group with respect to the d-line, νn is an Abbe number of the negative lens of the second lens group, and νp is an Abbe number of the positive lens of the second lens group.

3. The image position correcting optical system according to claim 2, wherein the negative lens and the positive lens of the second lens group are cemented to form a cemented lens.

4. The image position correcting optical system according to claim 1, wherein a distance between the second lens group and the third lens group is constant along an optical-axis direction.

5. The image position correcting optical system according to claim 1, wherein the front principal point of the third lens group is positioned closer to an image side of the system than the lens surface in the third lens group that is located nearest the object side of the system.

6. The image position correcting optical system according to claim 1, wherein the upper limit of the first condition set forth is 0.2.

7. The image position correcting optical system according to claim 1, wherein the upper limit of the first condition set forth is 0.0.

8. An image position correcting optical system comprising:

a first lens group that is fixed with respect to a direction perpendicular to an optical axis, a second lens group that is decentered as necessary in the direction perpendicular to the optical axis to correct an image position, and a third lens group that is fixed with respect to the direction perpendicular to the optical axis, the first, second and third lens groups being positioned in order from an object side of the system, the first lens group including a positive power lens group having a positive power and a negative power lens group having a negative power which are positioned in order from the object side of the system, the second lens group including a positive lens and a negative lens, the third lens group including a positive lens, a negative lens and an additional lens, the image position correcting optical system being a single-focus lens system of an internal focusing type in which focusing is performed by driving the negative power lens group along an optical-axis direction, the image position correcting optical system satisfying a condition:

$$-0.1 \leq |d|/f3 \leq 0.4$$

when $|d|$ is an absolute value of a distance from a back focal position of the second lens group to a front principal point of the third lens group and f3 is a focal length of the third lens group, and wherein:

$$0.7<|f2/F23|<1.3$$

when f2 is a focal length of the second lens group and F23 is a composite focal length of the second lens group and the third lens group.

9. The image position correcting optical system according to claim 8, wherein the second lens group is composed of a positive lens and a negative lens and has a positive power and:

$$0.15<Nn-Np<0.40, \text{ and}$$

$$15<\nu p-\nu n<40$$

when Nn is an index of refraction of the negative lens of the second lens group with respect to a d-line, Np is an index of refraction of the positive lens of the second lens group with respect to the d-line, νn is an Abbe number of the negative lens of the second lens group, and νp is an Abbe number of the positive lens of the second lens group.

10. The image position correcting optical system according to claim 9, wherein the negative lens and the positive lens of the second lens group are cemented to form a cemented lens.

11. The image position correcting optical system according to claim 8, wherein a distance between the second lens group and the third lens group is constant along an optical-axis direction.

12. The image position correcting optical system according to claim 8, wherein the front principal point of the third lens group G3 is positioned closer to an image side of the system than the lens surface in the third lens group that is located nearest the object side of the system.

13. An image position correcting optical system comprising:

a first lens group that is fixed with respect to a direction perpendicular to an optical axis, a second lens group that is decentered as necessary in the direction perpendicular to the optical axis to correct an image position, and a third lens group that is fixed with respect to the direction perpendicular to the optical axis, the first, second and third lens groups being positioned in order from the object side of the system, the first lens group including a positive power lens group having a positive power, a negative power lens group having a negative power, and a further lens group having a small power, the positive, negative and further lens groups being positioned in order from the object side, the second lens group including a positive lens and a negative lens, the third lens group including a positive lens, a negative lens and an additional lens, the image position correcting optical system being a single-focus lens system of an internal focusing type in which focusing is performed by driving the negative power lens group along an optical-axis direction, the image position correcting optical system satisfying a condition:

$$-0.1 \leq |d|/f3 \leq 0.4$$

when $|d|$ is an absolute distance from a back focal position of the second lens group to a front principal point of the third lens group and f3 is a focal length of the third lens group, and wherein:

$$0.7 < |f2/F23| < 1.3 \text{ and } 0.7 < |f2/F1c23| < 1.3$$

when f2 is a focal length of the second lens group, F23 is a composite focal length of the second lens group and the third lens group, and F1c23 is a composite focal length of the further lens group, the second lens group and the third lens group.

14. The image position correcting optical system according to claim 13, wherein the second lens group is composed of a positive lens and a negative lens and has a positive power and:

$$0.15 < Nn-Np < 0.40, \text{ and}$$

$$15 < \nu p - \nu n < 40$$

when Nn is an index of refraction of the negative lens of the second lens group with respect to a d-line, Np is an index of refraction of the positive lens of the second lens group with respect to the d-line, νn is an Abbe number of the negative lens of the second lens group, and νp is an Abbe number of the positive lens of the second lens group.

15. The image position correcting optical system according to claim 14, wherein the negative lens and the positive lens of the second lens group are cemented to form a cemented lens.

16. The image position correcting optical system according to claim 13, wherein the distance between the second lens group and the third lens group is constant along an optical-axis direction.

17. The image position correcting optical system according to claim 13, wherein the front principal point of the third lens group is positioned closer to an image side of the system than the lens surface in the third lens group that is located nearest the object side of the system.

18. An image position correcting optical system comprising:
a first lens group that is fixed with respect to a direction perpendicular to an optical axis,
a second lens group that is decentered as necessary in the direction perpendicular to the optical axis to correct an image position, and
a third lens group that is fixed with respect to the direction perpendicular to the optical axis, the first, second and third lens groups being positioned in order from the object side of the system,
the first lens group including a first positive power lens group having a positive power, a negative power lens group having a negative power, and a second positive power lens group having a positive power, the first positive, negative and second positive power lens groups being positioned in order from the object side,
the second lens group including a positive lens and a negative lens, the third lens group including a positive lens, a negative lens and an additional lens,
the image position correcting optical system being a zoom lens system in which a magnification is changed by driving the negative power lens group and the second positive power lens group along the optical-axis direction, the image position correcting optical system satisfying a condition:

$$-0.1 \leq |d|/f3 \leq 0.4$$

when $|d|$ is an absolute distance from a back focal position of the second lens group to a front principal point of the third lens group and f3 is a focal length of the third lens group, wherein:

$$0.7 < |f2/F23| < 1.3$$

when f2 is a focal length of the second lens group and F23 is a composite focal length of the second lens group and the third lens group.

19. The image position correcting optical system according to claim 18, wherein the second lens group is composed of a positive lens and a negative lens and has a positive power and:

$$0.15 < Nn-Np < 0.40, \text{ and}$$

$$15 < \nu p - \nu n < 40$$

when Nn is an index of refraction of the negative lens of the second lens group with respect to a d-line, Np is an index of refraction of the positive lens of the second lens group with respect to the d-line, νn is an Abbe number of the negative lens of the second lens group, and νp is an Abbe number of the positive lens of the second lens group.

20. The image position correcting optical system according to claim 19, wherein the negative lens and the positive lens of the second lens group are cemented to form a cemented lens.

21. The image position correcting optical system according to claim 18, wherein a distance between the second lens group and the third lens group is constant along an optical-axis direction.

22. The image position correcting optical system according to claim 18, wherein the front principal point of the third lens group is positioned closer to an image side of the system than the lens surface in the third lens group that is located nearest the object side of the system.

23. An image position correcting optical system comprising:
a first lens group that is fixed with respect to a direction perpendicular to an optical axis,
a second lens group that is decentered as necessary in the direction perpendicular to the optical axis to correct an image position, and
a third lens group that is fixed with respect to the direction perpendicular to the optical axis, the first, second and third lens groups being positioned in order from the object side of the system,
the first lens group including a first positive power lens group having a positive power, a negative power lens group having a negative power, a second positive power lens group having a positive power, and a further lens group having a small power, the first positive, negative, second positive and further lens groups being positioned in order from the object side,
the second lens group including a positive lens and a negative lens, the third lens group including a positive lens, a negative lens and an additional lens, the image position correcting optical system being a zoom lens system in which a magnification is changed by driving the negative power lens group and the second positive power lens group along an optical-axis direction, the image position correcting optical system satisfying a condition:

$$-0.1 \leq |d|/f3 \leq 0.4$$

when $|d|$ is an absolute distance from a back focal position of the second lens group to a front principal point of the third lens group and f3 is a focal length of the third lens group, and wherein:

$$0.7 < |f2/F23| < 1.3 \text{ and } 0.7 < |f2/F1d23| < 1.3$$

when f2 is a focal length of the second lens group, F23 is a composite focal length of the second lens group and the third lens group, and F1d23 is a composite focal length of the further lens group, the second lens group and the third lens group.

24. The image position correcting optical system according to claim 23, wherein the second lens group is composed of a positive lens and a negative lens and has a positive power and:

$$0.15 < Nn - Np < 0.40, \text{ and}$$

$$15 < vp - vn < 40$$

when Nn is an index of refraction of the negative lens of the second lens group with respect to a d-line, Np is an index of refraction of the positive lens of the second lens group with respect to the d-line, vn is an Abbe number of the negative lens of the second lens group, and vp is an Abbe number of the positive lens of the second lens group.

25. The image position correcting optical system according to claim 24, wherein the negative lens and the positive lens of the second lens group are cemented to form a cemented lens.

26. The image position correcting optical system according to claim 23, wherein a distance between the second lens group and the third lens group is constant along an optical-axis direction.

27. The image position correcting optical system according to claim 23, wherein the front principal point of the third lens group is positioned closer to an image side of the system than the lens surface in the third lens group that is located nearest the object side of the system.

28. An image position correcting optical system comprising:

a first lens group, a second lens group, and a third lens group, the first, second and third lens groups positioned in order from an object side of the system, the first lens group being fixed with respect to a direction perpendicular to an optical axis, the second lens group including a positive lens and a negative lens and being decentered in the direction perpendicular to the optical axis to correct an image position, the third lens group including at least one positive lens and at least one negative lens and being fixed with respect to the direction perpendicular to the optical axis, said image position correcting optical system satisfying a condition:

$$-0.1 \leq |d|/f_3 \leq 0.4$$

when d is a distance from a back focal position of the second lens group to a front principal point of the third lens group and $f_3$ is a focal length of the third lens group, and wherein:

$$0.7 < |f_2/f_{23}| < 1.3$$

when $f_2$ is a focal length of the second lens group and $f_{23}$ is a composite focal length of the second lens group and the third lens group.

29. The image position correcting optical system according to claim 28, wherein the second lens group has a positive power and:

$$0.15 < n_n/n_p < 0.40$$

$$0.15 < v_p - v_n < 40$$

when $n_n$ is an index of refraction of the negative lens of the second lens group with respect to a d-line, $n_p$ is an index of refraction of the positive lens of the second lens group with respect to the d-line, $v_n$ is an Abbe number of the negative lens of the second lens group, and $v_p$ is an Abbe number of the positive lens of the second lens group.

30. The image position correcting optical system according to claim 28, wherein the negative lens and the positive lens of the second lens group are cemented to form a cemented lens.

31. The image position correcting optical system according to claim 28, wherein the distance between the second lens group and the third lens group is constant along an optical-axis direction.

32. The image position correcting optical system according to claim 28, wherein the optical system is a single-focus lens, the first lens group includes a positive power lens group having a positive power and a negative power lens group having a negative power positioned in order from the object side of the system, and focusing is performed by driving the negative power lens group along an optical-axis direction.

33. The image position correcting optical system according to claim 28, wherein the optical system is a zoom lens, the first lens group includes a first positive power lens group having a positive power, a negative power lens group having a negative power, and a second positive power lens group having a positive power which are positioned in order from an object side of the system, and zooming is performed by driving the negative power lens group and the second positive power lens group along an optical-axis direction.

34. The image position correcting optical system according to claim 28, wherein the front principal point is positioned closer to an image than a lens plane of a lens included in the third lens group and located nearest an object.

35. An image position correcting optical system comprising:

a first lens group, a second lens group, and a third lens group, the first, second and third lens groups positioned in order from an object side of the system, the first lens group being fixed with respect to a direction perpendicular to an optical axis, the second lens group including a positive lens and a negative lens and being decentered in the direction perpendicular to the optical axis to correct an image position, the third lens group including at least one positive lens and at least one negative lens and being fixed with respect to the direction perpendicular to the optical axis, said image position correcting optical system satisfying a condition:

$$-0.1 \leq |d|/f_3 \leq 0.4$$

when d is a distance from a back focal position of the second lens group to a front principal point of the third lens group and $f_3$ is a focal length of the third lens group, and wherein the optical system is a single-focus lens, the first lens group includes a positive power lens group having a positive power, a negative power lens group having a negative power, and a further lens group having a small power positioned in order from the object side of the system, focusing is performed by driving the negative power lens group along an optical-axis direction, and:

$$0.7 < |f_2/f_{1c23}| < 1.3$$

when $f_{1c23}$ is a composite focal length of the further lens group of the first lens group, the second lens group and the third lens group and $f_2$ is a focal length of the second lens group.

36. An image position correcting optical system comprising:

a first lens group, a second lens group, and a third lens group, the first, second and third lens groups positioned in order from an object side of the system, the first lens group being fixed with respect to a direction perpendicular to an optical axis, the second lens group including a positive lens and a negative lens and being decentered in the direction perpendicular to the optical axis to correct an image position, the third lens group including at least one positive lens and at least one negative lens and being fixed with respect to the direction perpendicular to the optical axis, said image position correcting optical system satisfying a condition:

$$-0.1 \leq |d|/f_3 \leq 0.4$$

when d is a distance from a back focal position of the second lens group to a front principal point of the third lens group and $f_3$ is a focal length of the third lens group, and wherein the optical system is a zoom lens, the first lens group includes a first positive power lens group having a positive power, a negative power lens group having a negative power, a second positive power lens group having a positive power, and a further lens group having a small power, the first positive, negative, second positive and further lens groups are positioned in order from an object side of the system, zooming is performed by driving the negative power lens group and the second positive power lens group along an optical-axis direction, and:

$$0.7 < |f_2/f_{1d23}| < 1.3$$

when $f_{1d23}$ is a composite focal length of the further lens group of the first lens group, the second lens group and the third lens group and $f_2$ is a focal length of the second lens group.

* * * * *

UNITED STATES PATENT AND TRADEMARK OFFICE
CERTIFICATE OF CORRECTION

PATENT NO. : 5,828,490
DATED : October 27, 1998
INVENTOR(S) : Sato

It is certified that error appears in the above-identified patent and that said Letters Patent is hereby corrected as shown below:

On the title page, item [30] Foregin Application Priority Data, "Mar. 6, 1996" should read -- Jun. 3, 1996 --.

Signed and Sealed this

Twenty-fifth Day of May, 1999

Attest:

Q. TODD DICKINSON

*Attesting Officer*     Acting Commissioner of Patents and Trademarks